(No Model.)
C. MARIN.
HORSE COLLAR.
No. 283,717.  Patented Aug. 21, 1883.
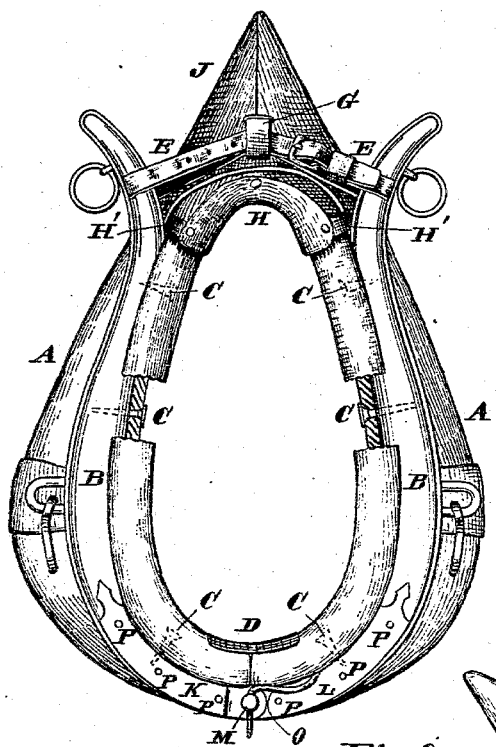
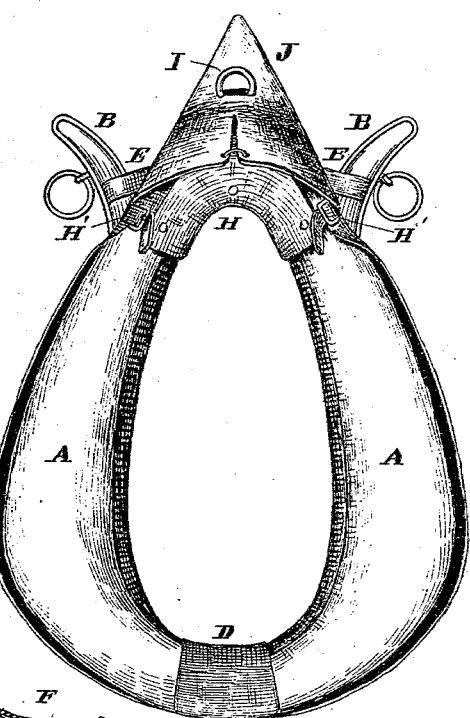
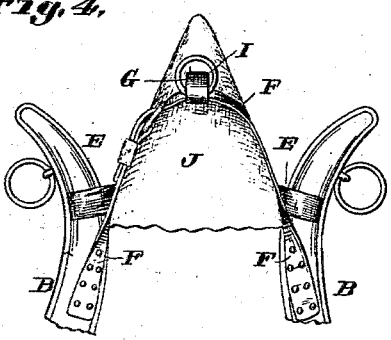
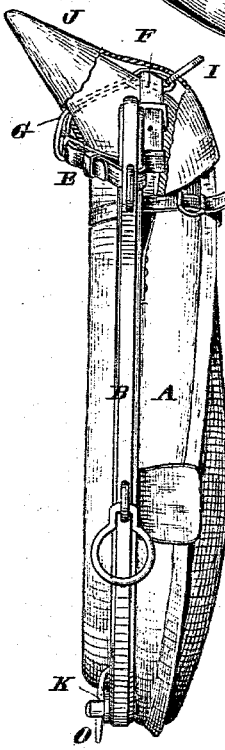
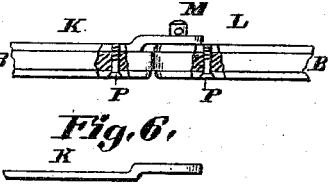
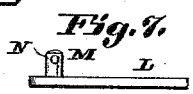
Attest:
Charles Pickles
Wm. J. Sayers
Inventor,
Chas. Marin
By Knight Bros
Attys

UNITED STATES PATENT OFFICE.

CHARLES MARIN, OF ST. LOUIS, MISSOURI, ASSIGNOR OF ONE-HALF TO GEO. J. DAILEY, OF SAME PLACE.

HORSE-COLLAR.

SPECIFICATION forming part of Letters Patent No. 283,717, dated August 21, 1883.

Application filed June 5, 1883. (No model.)

*To all whom it may concern:*

Be it known that I, CHARLES MARIN, of the city of St. Louis, in the State of Missouri, have invented a certain new and useful Improvement in Horse-Harness, of which the following is a full, clear, and exact description, reference being had to the accompanying drawings, forming part of this specification, and in which—

Figure 1 is a front view, Fig. 2 is a back view, Fig. 3 is an edge view, and Figs. 4, 5, 6, and 7 are detail views, illustrating the construction of different parts.

My invention relates to the collar and hames of a horse-harness; and my improvement consists in the construction hereinafter described, and pointed out in the claims.

Referring to the drawings, A represents the collar, and B B the hames. The latter are made to fit the former snugly, and are secured thereto by screws C, passing through from the interior groove of the collar into the hames. (See Fig. 1.) The collar is securely closed at top and is open at bottom, the joint being covered by a pad, D, (see Figs. 1 and 2,) secured to one part of the collar and overlapping the other. The collar can thus be opened at the bottom to be placed over the animal's neck, and the pad protects the animal's shoulder from being hurt by the joint in the collar when in use. The hames are secured together at top by a strap, E, which passes across in front of the collar, and by a strap, F, that passes over the top of the collar. (See Figs. 3 and 4.) The two straps are connected near their middles and held in place by a tie-strap, G, that passes through the top of the collar. (See Fig. 3.) These straps E and F are provided with buckles, so that they can be tightened or loosened to give the desired shape to the collar. The hames being secured to the collar, the latter can be more or less compressed and its shape changed by tightening these straps. The neck-pad H is secured to the collar by straps H'.

I represents a ring secured to the strap G for the attachment of the back-strap of the harness to the collar.

J represents a hood covering the top of the collar, and held in place by the strap G, passing through it, as shown.

K L represent metal plates secured to the lower ends of the hames, respectively, one of which, K, is perforated and overlaps the other, L, as shown in Figs. 1 and 5, and the plate L has a pin or stem, M, that receives the perforated end of the plate K, and the pin has a transverse hole, N, to receive a leather or other key, O. The collar and hames are thus securely held on the animal's neck, and when they are to be removed the key O is simply pulled out and the plates disconnected, as shown in Figs. 6 and 7, when the collar and hames are free to be opened out. The plates are secured to the hames by screws P, so that they can be easily replaced by others if broken, and the hames and collar being connected by screws they also can be easily separated for repairs and renewal.

I claim as my invention—

1. The combination of the collar, hames secured thereto, front strap, E, rear top strap, F, and tie-strap G, as set forth.

2. The combination of the collar, hames secured thereto, front strap, E, top strap, F, and tie-strap G, having ring I for the attachment of the back-strap, as set forth.

3. The combination of collar, hames secured thereto, front strap, E, top strap, F, hood J, and tie-strap G, passing through said hood, as set forth.

4. The combination of collar, hames secured thereto, metal plates K and L, secured to the lower ends of the hames and overlapping each other, one plate having a pin with transverse hole, the other plate having a perforated end, and a key to insert in the pin, as set forth.

5. The combination of collar, hames secured thereto, strap securing the hames together at top in front, strap securing hames to top of collar, tie-strap securing two straps together through the top of the collar, and means for securing the hames and collar detachably together at bottom, as set forth.

CHARLES MARIN.

In presence of—
GEO. H. KNIGHT,
SAML. KNIGHT.